United States Patent [19]

Starr

[11] Patent Number: 4,649,363

[45] Date of Patent: Mar. 10, 1987

[54] SENSOR

[75] Inventor: James B. Starr, St. Paul, Minn.

[73] Assignee: Honeywell Inc., Minneapolis, Minn.

[21] Appl. No.: 757,715

[22] Filed: Jul. 22, 1985

[51] Int. Cl.⁴ .............................................. G01L 10/22
[52] U.S. Cl. ........................................ 338/4; 338/42;
73/721; 73/862.65
[58] Field of Search ....................................... 338/2–5,
338/42; 73/721, 862.68, 862.65, 398 AR;
29/610 SG

[56] References Cited

U.S. PATENT DOCUMENTS

| | | | |
|---|---|---|---|
| 4,040,297 | 8/1971 | Karsmakers | 338/42 X |
| 4,135,408 | 1/1979 | Di Giouanni | 73/721 |
| 4,295,115 | 10/1981 | Takahashi et al. | 338/42 X |
| 4,364,276 | 12/1982 | Shimazoe et al. | 73/721 |
| 4,454,771 | 6/1984 | Shimazoe et al. | 73/862.68 |

Primary Examiner—E. A. Goldberg
Assistant Examiner—M. M. Lateef
Attorney, Agent, or Firm—William T. Udseth

[57] ABSTRACT

A sensor having a silicon die having a central region and a flexible annular sensing portion surrounding the central region. The sensor has apparatus carried by the central region of the die for limiting the movement of the central region in each of two opposite directions.

8 Claims, 3 Drawing Figures

SENSOR

BACKGROUND OF THE INVENTION

The present invention is being described in the context of a pressure sensor. However, the present invention applies equally well to other sensors. The present invention is a new stop configuration that limits diaphragm stresses in a sensor.

SUMMARY OF THE INVENTION

The present invention is a sensor comprising a silicon die having a central region and a flexible annular sensing portion surrounding the central region. The sensor comprises apparatus carried by the central region of the die for limiting the movement of the central region in each of two opposite directions.

DETAILED DESCRIPTION OF THE PREFERRED EMBODIMENTS

Low-cost, high-performance pressure sensors are manufactured currently using silicon integrated circuit processing technology. Typically, these sensors are manufactured by diffusing or ion implanting piezoresistive elements on one side of a silicon wafer. Thin diaphragms (e.g., 0.06 inch diameter by 0.001 inch thickness) are formed in the wafer by chemically etching the reverse side of the wafer. The wafer is then divided by sawing into numerous die, each die having on one surface piezoresistive sensing elements and on the other surface an etched cavity. Die sizes of 0.1 inch by 0.1 inch are typical. Diaphragms can be made relatively thin with respect to their diameter so as to measure pressures as low as 1.0 inch $H_2O$ gauge.

A typical limitation encountered with low pressure sensors is their inability to withstand high overpressures. Signals are produced by such sensors by generating diaphragm stresses where piezoresistive sensing elements are located. In general, signal level is proportional to diaphragm stress. If such stresses exceed a value in excess of 45,000 psi, breakage of diaphragms may be encountered. Thus, the overpressure limit of sensors designed to measure low pressures is also relatively low.

Conventional pressure sensor design in general provides for mechanisms to limit diaphragm stresses above a specified pressure. Heretofore, such mechanisms used in conjunction with silicon pressure sensors have been relatively large and expensive. This has in many cases negated the inherent cost and size advantage of silicon pressure sensors.

Figure 1:
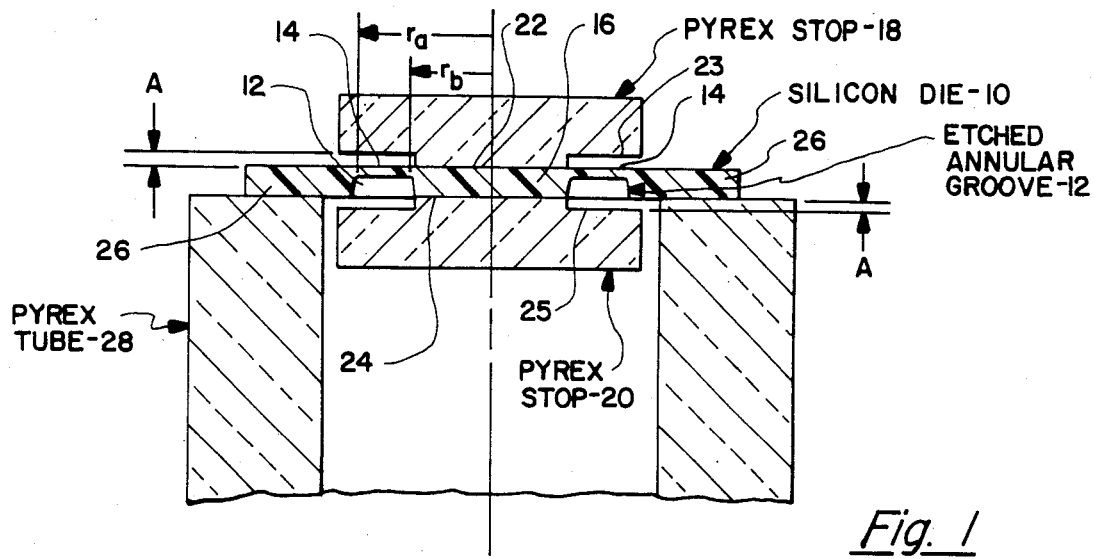

The present invention described here provides overpressure protection for silicon pressure sensors while preserving size and cost advantages. Protection is provided as illustrated in FIG. 1. A sensor die 10 of silicon or other suitable semiconductor material is formed by etching an annular groove 12 in the back side of the die. The remaining thin web or sensing portion 14 has an outer radius $r_a$ and an inner radius $r_b$. In effect, what is formed is a diaphragm or sensing portion 14 with a rigid center region 16.

To center region 16 is rigidly attached upper and lower stops 18 and 20 respectively. Stops 18 and 20 are preferably fabricated of a borosilicate glass such as Corning Glass Company type 7740 sold under the trademark "Pyrex" or Corning type 3320, 7056, 7720 and 0120 glass. In the preferred embodiment, stops 18 and 20 are circular disks, but other configurations can be used.

First surfaces 22 and 24 of stops 18 and 20 respectively are each made optically flat (typically flat within four millionths of an inch) so as to be suitable for thermal-electric bonding of the stops to the opposite surfaces of rigid central region 16 of die 10. Thermal-electric bonding, also sometimes referred to as field assisted anodic bonding, is a process familiar to those skilled in the art. The preferred method of performing the thermal-electric bonding is to provide the optically flat surface not only on first surfaces 22 and 24 of stops 18 and 20, but also on the opposing sides of central region 16 of die 10. The desired optical flatness is normally obtained by lapping. The thermal-electric bond is typically obtained by raising the temperature of the assembled parts up to approximately 350 to 500 degrees Centigrade and then applying a 1,000 volt DC electric potential across the parts.

Before bonding, however, a portion of the optically flat surface on each stop is etched away by an amount A. Through this process, stops 18 and 20 are each formed into glass members, each having a central portion with first surfaces 22 and 24 respectively and an outer portion with recessed surfaces 23 and 25 respectively, the first surface and the recessed surface of each member typically being parallel; the bottom surface of the central region of the die and the bottom surface of the peripheral support of the die typically are co-planar and parallel to the top surface of the die (while other configurations are possible, they are not illustrated here). Surfaces 22 and 24 of stops 18 and 20 respectively are then rigidly attached to opposite surfaces of central region 16 of die 10. With a portion of the recessed surface of each stop facing the peripheral support of the die, the deflection of central region 16 relative to peripheral support 26 of die 10 is limited to distance A. Typical values of A would be in the vicinity of 0.001 inch.

Assuming that the sensor is to be used in a pressure sensing application, peripheral support 26 of die 10 is hermetically sealed to a pressure vessel; a Pyrex or other suitable glass tube 28 forms the pressure vessel in the preferred embodiment, preferably also using the thermal-electric bonding process discussed above to form the hermetic seal.

Figure 2:
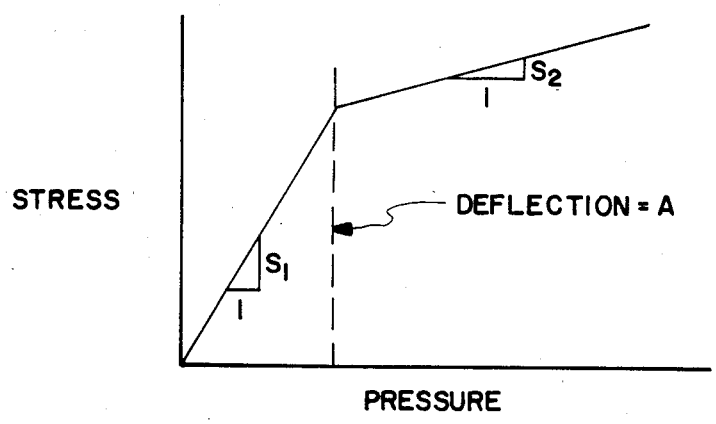
Figure 3:
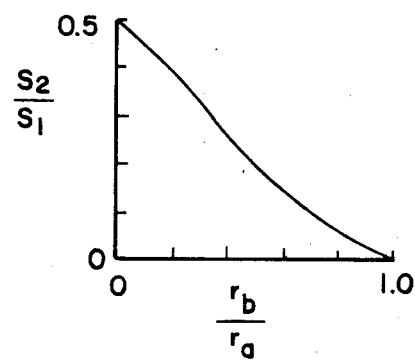

The limiting of the deflection of diaphragm or sensing portion 14 through the present invention has the effect of reducing the rate at which maximum diaphragm stresses increase with pressure. At the outer edge of diaphragm 14, stresses will vary with pressure as shown in FIG. 2. The ratio of $S_2$ to $S_1$ depends on the ratio of inner radius $r_b$ to outer radius $r_a$ of sensing portion 14. The change in $S_2/S_1$ with $r_b/r_a$ is plotted in FIG. 3.

Strictly speaking, the present invention does not limit stress to a prescribed value. However, by using a relatively large value of $r_b/r_a$, the rate at which stress increases with pressure is greatly reduced. In extreme cases of very high overpressures, some additional external mechanism may be required in addition to the present invention. However, the use of the device described here will greatly relax the requirements placed on external mechanisms so as to reduce their cost and size.

Note also that, with the present invention, sensor 10 can serve as a dual-range sensor operating with reduced sensitivity at higher pressures as illustrated in FIG. 2.

The embodiments of the invention in which an exclusive property or right is claimed are defined as follows:

1. A sensor, comprising:
   a die having a central region, a flexible annular sensing portion surrounding the central region, and a peripheral support structure supporting the flexible annular sensing portion; and
   means attached to the central region of the die for limiting the extent of movement of the central region in each of two opposite directions by such means encountering the peripheral support structure.

2. The sensor of claim 1 wherein the means attached to the central region of the die comprises first and second portions, one portion being attached to a first surface of the central region of the die, the other portion being attached to a second substantially opposite surface of the central region of the die.

3. A pressure sensor, comprising:
   a die having a central region, a flexible annular sensing portion surrounding the central region, and a peripheral support structure supporting the flexible annular sensing portion;
   means attached to the central region of the die for limiting the extent of movement of the central region in each of two opposite directions by such means encountering the peripheral support structure; and
   a pressure vessel comprising a housing and means for hermetically sealing the housing to the die.

4. The sensor of claim 3 wherein the means attached to the central region of the die comprises first and second portions, one portion being attached to a first surface of the central region of the die, the other portion being attached to a second substantially opposite surface of the central region of the die.

5. A sensor, comprising:
   a die having a central region, a peripheral support, and a flexible annular sensing portion, the annular sensing portion being less thick than the central region and the peripheral support, the annular sensing portion being located between the central region and the peripheral support;
   a first member having a central portion with a first surface and an outer portion surrounding the central portion, the outer portion having a surface recessed from the first surface, the first surface of the first member being rigidly attached to a first surface of the central region of the die, a portion of the recessed surface of the first member facing the peripheral support of the die; and
   a second member having a central portion with a first surface and an outer portion surrounding the central portion, the outer portion of the second member having a surface recessed from the first surface, the first surface of the second member being rigidly attached to a second substantially opposite surface of the central region of the die, a portion of the recessed surface of the second member facing the peripheral support of the die.

6. The sensor of claim 5 wherein:
   the first and second members are each fabricated of a material comprising glass; and
   the first and second members are each attached to the central region of the die by a thermal-electric bond.

7. A sensor, comprising:
   a die having a central region, a peripheral support, and a flexible annular sensing portion, the annular sensing portion being less thick than the central region and the peripheral support, the annular sensing portion being located between the central region and the peripheral support;
   a pressure vessel comprising a housing and means for hermetically sealing the housing to the peripheral support of the die;
   a first member having a central portion with a first surface and an outer portion surrounding the central portion, the outer portion having a surface recessed from the first surface, the first surface of the first member being rigidly attached to a first surface of the central region of the die, a portion of the recessed surface of the first member facing the peripheral support of the die; and
   a second member having a central portion with a first surface and an outer portion surrounding the central portion, the outer portion of the second member having a surface recessed from the first surface, the first surface of the second member being rigidly attached to a second substantially opposite surface of the central region of the die, a portion of the recessed surface of the second member facing the peripheral support of the die.

8. The sensor of claim 7 wherein:
   the first and second members are each fabricated of a material comprising glass; and
   the first and second members are each attached to the central region of the die by a thermal-electric bond.

* * * * *